E. EMMERT.
Grain-Drill.

No. 17,144. Patented Apr. 28, 1857.

UNITED STATES PATENT OFFICE.

E. EMMERT, OF FRANKLIN GROVE, ILLINOIS.

IMPROVEMENT IN SEED-DRILLS.

Specification forming part of Letters Patent No. 17,144, dated April 28, 1857.

*To all whom it may concern:*

Be it known that I, EZRA EMMERT, of Franklin Grove, in the county of Lee and State of Illinois, have invented a new and useful Improvement in Seed-Drills; and I do hereby declare that the following is a full, clear, and exact description of the same, reference being had to the accompanying drawings, forming part of this specification, in which—

Figure 1:
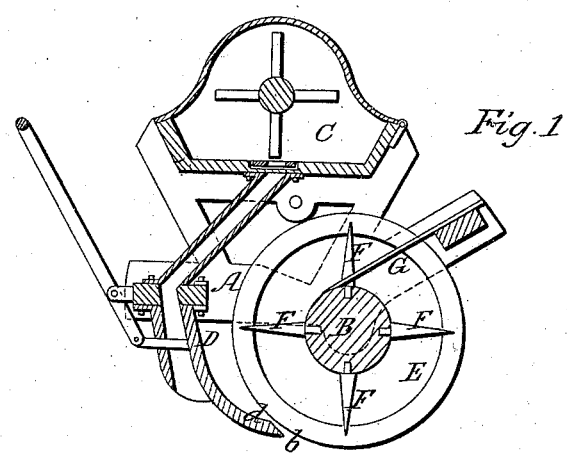
Figure 2:
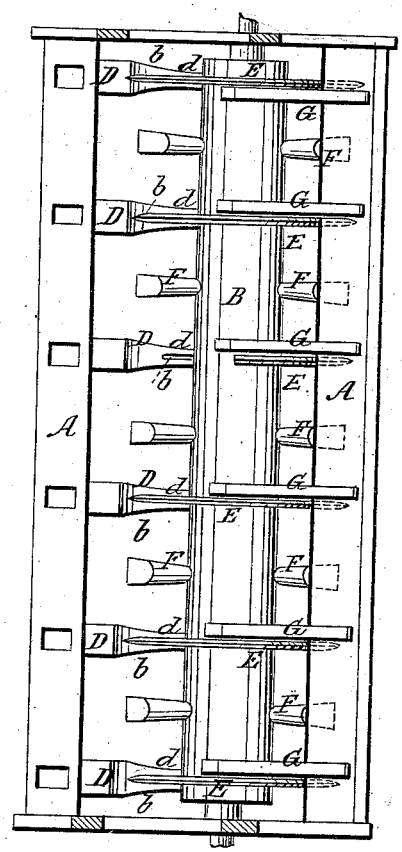

Figure 1 is a vertical transverse section of a seed-drill having my improvement applied to it. Fig. 2 is a plan or top view, the seed-hopper and conducting-spouts being removed.

Similar letters of reference indicate corresponding parts in both figures.

The nature of my invention consists in the employment of a series of edged wheels similar to circular cutters on the propelling-axle of the seed-drill in combination with the drill-teeth, which have a curved extension on their lower extremity, said axle or wheels or cutters being arranged in front of the drill-teeth and the edge of the cutters or wheels revolving through a slit formed in the extremity of the extension. By thus employing a series of wheels or cutters on the propelling-axle and in the relation to the drill-teeth stated a threefold object is accomplished: First, the carriage of the drill is propelled forward without the aid of ordinary propelling-wheels; second, the drill-teeth are saved from being clogged and put out of operative condition, as the wheels or cutters cut up or demolish weeds, &c., before they have a chance to collect around the teeth, and consequently corn can be planted in check-rows equally as well as in drills, and the operation of planting in rows and drills rendered far more perfect; third, prairie-sod or any kind of land can be drilled so as to be suitable for receiving seed without the necessity of a first plowing at the same time that it is passed over for the purpose of dropping the seed, and also soil which is lumpy and covered with cornstalks, brush, &c., can be operated upon and reduced to a condition suitable for receiving seed at the same time that it is passed over for the purpose of dropping the seed.

To enable others skilled in the art to make and use my invention, I will proceed to describe its construction and operation.

A represents the frame, B the propelling-axle, and C the hopper of a seed-drill.

D D are the drill-teeth; $d$, the curved extension, formed on the front lower extremity of the same so as to stand partly under the axle, as shown; and $b$, a slit cut in the end of the extension.

E E are wheels similar in construction to circular-edged cutters. They are arranged on the axle at a suitable distance apart, so as to rest on the soil, and each has its edge placed in the slit $b$ of the extension, as represented.

F F are radial beaters or arms in the axle for assisting in the propelling of the drill and also in the pulverization of the soil.

G G are elastic scrapers attached to the front of the frame, and arranged so as to touch the faces of the cutters and to bear on the axle. These scrapers remove whatever soil or obstructions may adhere to the axle and cutters in their revolution.

Operation: As the machine moves forward the axle and cutters revolve and the soil drilled for the reception of seed by the cutters, which are caused to enter the soil by the weight of the frame, &c., and at the same instant all grass, stubble, and roots which may come before the drill-teeth are cut up and demolished or pressed down by the wheels or cutters before they have time to collect on the points of the teeth, and thus prevented from throwing the drill-teeth up above the surface of the soil out of operative condition and from catching the seed in falling and preventing it entering the drill.

This invention has been found by long practical use to be very important to farmers, as it is almost impossible for them without it to keep the drill-teeth free from obstructions, unless a man is employed specially for this purpose, and even then much delay is experienced and the planting is very imperfect; and besides this most beneficial result, another almost equal in importance results from its use, the necessity of plowing the soil, whether cultivated prairie or sod land, with a separate implement from that employed for planting the seed being obviated, it forming the furrow and reducing all obstructions at the same time that the seed is planted.

I do not claim broadly the use of edge-wheels in seeding-machines; neither do I claim broadly the use of extension-tubes; but

What I claim, and desire to secure by Letters Patent, is—

The arrangement and combination of the wheels E with the extension-pieces $d$, in the manner and for the purposes substantially as described.

EZRA EMMERT.

Witnesses:
DAVID WELTY,
B. C. GOODWIN.